US012668500B2

(12) United States Patent
Nadimpalli et al.

(10) Patent No.: US 12,668,500 B2
(45) Date of Patent: Jun. 30, 2026

(54) PRODUCTION OF STABLE AND UNIFORMLY DISPERSED NANOPARTICLES

(71) Applicant: Tata Consultancy Services Limited, Mumbai (IN)

(72) Inventors: Naga Ravikumar Varma Nadimpalli, Pune (IN); Kshitij Saxena, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 715 days.

(21) Appl. No.: 17/406,875

(22) Filed: Aug. 19, 2021

(65) Prior Publication Data

US 2022/0098050 A1 Mar. 31, 2022

(30) Foreign Application Priority Data

Aug. 20, 2020 (IN) ............................ 202021035975

(51) Int. Cl.
*C01F 17/00* (2020.01)
*C01F 17/235* (2020.01)
*B82Y 40/00* (2011.01)

(52) U.S. Cl.
CPC ............ *C01F 17/235* (2020.01); *B82Y 40/00* (2013.01); *C01P 2004/64* (2013.01); *C01P 2006/82* (2013.01)

(58) Field of Classification Search
None
See application file for complete search history.

(56) References Cited

U.S. PATENT DOCUMENTS

2017/0298252 A1* 10/2017 Arnepalli ............ C09K 3/1436

FOREIGN PATENT DOCUMENTS

JP 5324459 B2 10/2013
WO WO-03089374 A1 * 10/2003 ............ B82Y 30/00

OTHER PUBLICATIONS

Pati, Sudhanshu et al., "A Simple Approach to Produce Stable Ferrofluids Without Surfactants and With High Temperature Stability", Journal of Nanofluids, Jan. 2013, Research Gate, https://www.researchgate.net/publication/284434017_The_prodigious_effects_of_concentration_https://www.researchgate.net/publication/248400129 A Simple Approach to Produce Stable Ferrofluids Without Surfactants and With High Temperature Stability/link/0deec51dfe23fc5497000000/download.

(Continued)

*Primary Examiner* — Yun Qian
(74) *Attorney, Agent, or Firm* — Finnegan, Henderson, Farabow, Garrett & Dunner, LLP

(57) ABSTRACT

This disclosure relates generally to production of stable and uniformly dispersed nanoparticles. Convention methods of nanoparticle production includes a two-step approach that utilizes additives or surface modifiers. The disclosed method avoids using any additives/surface modifiers owing to the environmental and economic implications. The method includes employing process conditions in a reaction to manipulate electrostatic double layer repulsive forces among nanoparticles to impart the dispersion stability of nanoparticles. The reaction includes pouring pH modifier dropwise into metal precursor solution with vigorous stirring forming metal hydroxide solution, while maintain ranges for concentration of metal precursor solution about 0.15M to 0.75 M, pH about 9 to 12, ionic conductivity about 50 to 200 mS/cm, stirring speed about 800 to 1200 rpm, aging time 6 to 24 hours. The metal hydroxide solution is heated with temperature maintained in range of 100 to 400° C. to obtain nanoparticle slurry comprising a stable suspension of the nanoparticles.

4 Claims, 7 Drawing Sheets

(56) References Cited

OTHER PUBLICATIONS

Ali, Naser et al., "A Review on Nanofluids: Fabrication, Stability, and Thermophysical Properties", Journal of Nanomaterials, Jun. 2018, vol. 2018, Hindawi, https://downloads.hindawi.com/journals/jnm/2018/6978130.pdf.
Wu, Qingliu et al., "Synthesis of Nanoparticles via Solvothermal and Hydrothermal Methods", Handbook of Nanoparticles, Jun. 2015, pp. 1-28, Springer, https://www.researchgate.net/publication/292614450 Synthesis of Nanoparticles via Solvothermal and Hydrothermal Methods/link/5a746f41aca2720bc0ddab9d/download.
Hayashi, Hiromichi, et al., "Hydrothermal Synthesis of Metal Oxide Nanoparticles in Supercritical Water", Materials, Jun. 2010, vol. 3 (7), pp. 3794-3817, MDPI, https://www.mdpi.com/1996-1944/3/7/3794.
Maurizi, Lionel et al., "One step continuous hydrothermal synthesis of very fine stabilized superparamagnetic nanoparticles of magnetite", Chemical Communications, Sep. 2011, vol. 47 (42), pp. 11706-11708, PubMed, https://www.researchgate.net/publication/51667231 One step continuous hydrothermal synthesis of very fine stabilized superparamagnetic nanoparticles of magnetite/link/54294bda0cf26120b7b5b64c/download.
Torres-Gómez, Nayely et al., "Shape Tuning of Magnetite Nanoparticles Obtained by Hydrothermal Synthesis: Effect of Temperature", Journal of Nanomaterials, Jan. 2019, vol. 2019 (4), pp. 1-5, Hindawi, https://www.researchgate.net/publication/330954299 Shape Tuning of Magnetite Nanoparticles Obtained by Hydrothermal Synthesis Effect of Temperature/link/5c5cf10492851c48a9c18e70/download.
Mera, Isidoro Martínez et al., "Synthesis of magnetite (Fe 3O 4) nanoparticles without surfactants at room temperature", Materials Letters, Sep. 2007, vol. 61 (23), pp. 4447-4451, MDPI, https://www.researchgate.net/publication/330954299 Shape Tuning of Magnetite Nanoparticles Obtained by Hydrothermal Synthesis Effect of Temperature/link/5c5cf10492851c4889c18e70/download.

* cited by examiner

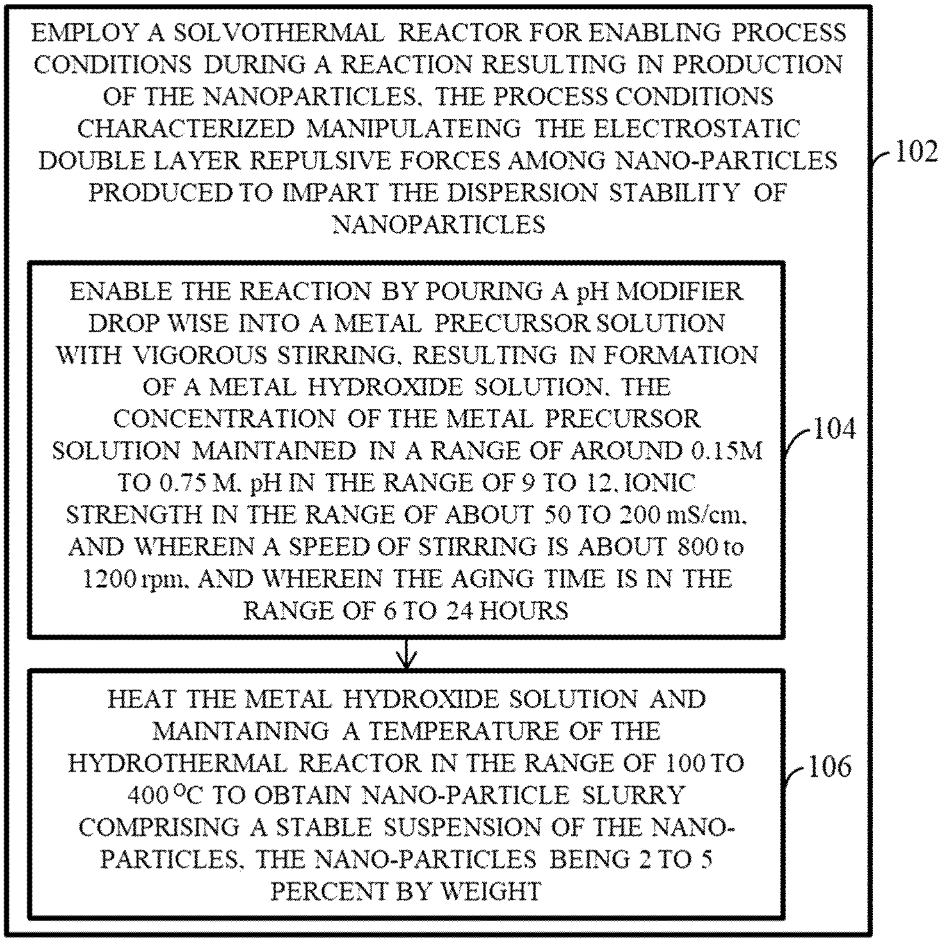

EMPLOY A SOLVOTHERMAL REACTOR FOR ENABLING PROCESS CONDITIONS DURING A REACTION RESULTING IN PRODUCTION OF THE NANOPARTICLES, THE PROCESS CONDITIONS CHARACTERIZED MANIPULATEING THE ELECTROSTATIC DOUBLE LAYER REPULSIVE FORCES AMONG NANO-PARTICLES PRODUCED TO IMPART THE DISPERSION STABILITY OF NANOPARTICLES ⌐102

ENABLE THE REACTION BY POURING A pH MODIFIER DROP WISE INTO A METAL PRECURSOR SOLUTION WITH VIGOROUS STIRRING, RESULTING IN FORMATION OF A METAL HYDROXIDE SOLUTION, THE CONCENTRATION OF THE METAL PRECURSOR SOLUTION MAINTAINED IN A RANGE OF AROUND 0.15M TO 0.75 M, pH IN THE RANGE OF 9 TO 12, IONIC STRENGTH IN THE RANGE OF ABOUT 50 TO 200 mS/cm, AND WHEREIN A SPEED OF STIRRING IS ABOUT 800 to 1200 rpm, AND WHEREIN THE AGING TIME IS IN THE RANGE OF 6 TO 24 HOURS ⌐104

HEAT THE METAL HYDROXIDE SOLUTION AND MAINTAINING A TEMPERATURE OF THE HYDROTHERMAL REACTOR IN THE RANGE OF 100 TO 400 °C TO OBTAIN NANO-PARTICLE SLURRY COMPRISING A STABLE SUSPENSION OF THE NANO-PARTICLES, THE NANO-PARTICLES BEING 2 TO 5 PERCENT BY WEIGHT ⌐106

FIG. 1    100

PRODUCTION OF STABLE AND UNIFORMLY DISPERSED NANOPARTICLES

PRIORITY CLAIM

This U.S. patent application claims priority under 35 U.S.C. § 119 to: India Application No. 202021035975, filed on Aug. 20, 2020. The entire contents of the aforementioned application are incorporated herein by reference.

TECHNICAL FIELD

This disclosure relates generally to nanoparticles production, and more particularly to method for production of stable and uniformly dispersed nanoparticles using solvothermal process.

BACKGROUND

The use of nanoparticles for various commercial applications have been gaining great attention in recent decades, which has already exceeded 10 million tons in capacity with above 2 trillion USD global market. The important features of nanoparticles including unique physicochemical properties such as chemical, optical, electrical, magnetic, which are responsible for diverse applications of nanoparticles, can be exploited to make them suitable for many potential applications such as pigments, catalysts, UV-stabilizing agents, chemical mechanical planarization (CMP) abrasives, and photo-catalysts, and so on.

The aforementioned important features of nanoparticles are a strong function of product particle properties such as particle size, morphology, crystallinity, polarity, and stability (chemical, thermal, structural, and dispersion). Amongst the product particle properties, the stability of nanoparticles determines the fate of nanoparticles and consequently the stability of end application performance. Therefore, the production of well dispersed and stable nanoparticles, while obtaining the targeted particle size, size distribution and crystallinity, is inevitable for obtaining the targeted performance and consequently rational design and production of nanoparticles.

SUMMARY

Embodiments of the present disclosure present technological improvements as solutions to one or more of the above-mentioned technical problems recognized by the inventors in conventional systems. For example, in one embodiment, a solvothermal synthesis-based method for production of stable and uniformly dispersed nanoparticles is provided. The method includes employing a solvothermal reactor for enabling process conditions during a reaction resulting in production of the nanoparticles, the process conditions characterized by manipulating the electrostatic double layer repulsive forces among nanoparticles produced to impart the dispersion stability of nanoparticles produced as a result of the reaction, wherein enabling the process conditions comprises enabling the reaction by pouring pH modifier drop wise into a metal precursor solution with vigorous stirring, resulting in formation of a metal hydroxide solution, the concentration of the metal precursor solution maintained in a range of about 0.15M to 0.75 M, pH in the range of 9 to 12, ionic conductivity in the range of about 50 to 200 mS/cm, and wherein a speed of stirring is about 800 to 1200 rpm, and wherein the aging time is in the range of 6 to 24 hours; and heating the metal hydroxide solution and maintaining a temperature of the solvothermal reactor in the range of 100 to 400° C. to obtain nanoparticle slurry comprising a stable suspension of the nanoparticles.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a flow-diagram of a method for production of stable and uniformly distributed nanoparticles, in accordance with an example embodiment.

DETAILED DESCRIPTION

Figure 2:
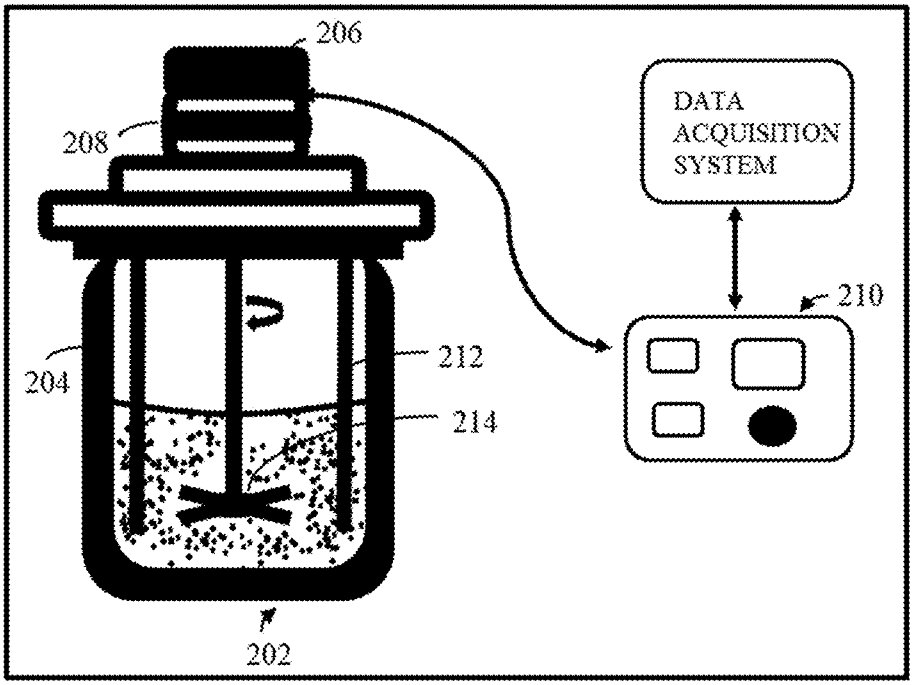
FIG. 2 is a solvothermal reactor for production of stable and uniformly distributed nanoparticles, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Although nanoparticle production methods, such as sol-gel, microemulsion, co-precipitation, hydrothermal, solvothermal, pyrolysis, flame synthesis, and so on are relatively successful in controlling the particle size, size distribution, shape, and crystallinity, there is a limited success in producing the well dispersed nanoparticles without using surface modifiers in a single step process. Owning to high surface energy and associated strong interactions among particles results in agglomerated nanoparticles. Since nanoparticle agglomeration is highly unavoidable, typically, surface modifiers like surfactants, additives, polymers are used to produce the well dispersed nanoparticles by arresting the surface interactions.

Conventionally, well dispersed nanoparticles are produced in a two-step approach. Initially, the nanoparticle-based aggregates are produced using either gas phase or liquid phase synthesis methods and then de-agglomeration is carried out either through chemical or mechanical means or both. However, there is a strong need for the production of stable well dispersed nanoparticles without using any additives or surface modifiers owing to the environmental and economic implications of the same.

Irrespective of nanoparticle synthesis method, nanoparticles produced typically have significant number of unsaturated surface atoms resulting in increase in surface energy. Owing to high surface energy, nanoparticles typically tend to form aggregates due to the van der Waals attraction forces and thus nanoparticles are thermodynamically unstable. Thus, nanoparticles are typically very active (or reactive) which constantly undergoes various physicochemical reactions to form a relatively stable particles. However, nanoparticles can be kinetically stabilized by counter balance of electrostatic or steric forces or combination of them, by introducing the common stabilizers such as surfactants, organic ligands, polymers and dendrimers etc. The nature and strength of the interaction potential between nanoparticle surface and stabilizers determine the stability of dispersions. These interactions typically can be covalent linkages or a chemisorption of a polymer atom or a formation of an electric double layer with surfactant. The stabilizers are generally introduced during the synthesis process.

Various methods have been proposed in the literature to produce stable nanoparticles using chemical, mechanical and mechanico-chemical methods. For example in known method for preparing stable passivated semiconductor nanoparticles through high energy ball milling in the presence of reactive medium which contains poly-functional molecules. The reactive molecules include dicarboxylic acids and diols which impart reactive properties to functionalized nanoparticles—these are covalently bonded with other materials. Here, the high-energy ball milling is used to convert the indirect band gap semiconductors to direct band gap semiconductors. Initially, the bulk silicon material undergoes milling that results in creating the fresh surfaces in the form of fragmented particles. The fragments, which are highly reactive owning to the high surface energy, undergoes the surface reaction with the reactive medium (typically organic solvents) to form covalent bonds. The solvent medium not only stabilizes as produced nanoparticles but also separates them from bulk solid phase. Thus, this method is used to produce stable functionalized semiconductor nanoparticles which can also inherently separate the nanoparticles from the bulk solid phase. The functionalized nanoparticles can be separated. The proposed methods have been employed to produce the direct band gap semiconductor nanoparticles, which are used in light emitting devices. Although, it is useful to produce the functionalized nanoparticles, it is difficult to control the morphology.

In another known method, dispersibility of metal nanoparticles is described using the chemical reduction method with the use of surfactants. The nanoparticles formed have a uniform particle size and are stable in both polar and non-polar solvents. There are no large microparticles produced in the process.

In yet another known method, preparing novel metal nanoparticle by controlling the size with the use of surfactant is described. The particles formed are in the range of 25-40 nm which are suitable for many applications which require single-dispersed particles.

In still another known method, preparation of uniformly dispersed novel nanoparticle is described in the presence of surfactant as surface modifier on a porous carrier. A reducing agent is also used to make final noble metal nanoparticles stable on the hydroxide.

In the field of stable mono-dispersed particles, the literature includes various teachings from the Chemical Mechanical Polishing industry. For example, a known literature describes provisioning of a composition for chemical-mechanical polishing. The literature discloses abrasives which are coated with an activator. The particle size varies in the range of 10-1000 nm. The particle size range for CMP applications should have less of deviation as it results in more no. of active abrasives.

In still another known method, solvothermal synthesis of ceria is disclosed to result in mono-dispersed particles. The abrasive particles are between 0.1 and 3 weight % of the slurry. The abrasive particles include a silicon core and a ceria shell covering the silicon core and the particle size is in the range of 20-30 nm and surfactant is being used to make these stable particles. A precursor material is used into the solution maintaining a pH of the solution at a pH greater than 7 and subjecting the solution to a pressure greater than 100 psi and a temperature greater than 100° C. in a reaction vessel.

Since nanoparticle synthesis involves dissolution of metal salt (precursor) and base (used to control pH), which results in the formation of various monovalent and polyvalent ions during the synthesis which not only affects the chemical kinetics of formation of product molecules but also the stability of as formed product nanoparticles. In a known study, a thermodynamic speciation of metal salt solutions at different pH values and ionic strengths (or ionic conductivity) was presented. Further, the effect of different ions on the colloidal stability of as synthesized metal oxide nanoparticles has been studied. The inter-particle forces acting on the as synthesized nanoparticle in the presence of dissolved ions are van der Walls attractions and electrostatic double layer repulsive forces. The former is always present, independent of the solution composition, whereas the latter is strongly dependent on the ionic strength of the solution. The interplay between these interactions determine the final stability of nanoparticles in the solution. The electrostatic double layer repulsive forces can be manipulated by changing the ionic strength of the solution. For example, the repulsive forces are screened as ionic strength increases whereas those are more prominent as ionic strength decreases. At isoelectric point (ISP), the electrostatic interactions are completely screened resulting in a destabilization of the nanoparticle suspension, by forming aggregates. The critical coagulation concentration determines the transition of the stable and unstable system of nanoparticle slurry. Thus it is possible to produce a stable nanoparticle slurry by manipulating the interaction potentials of the nanoparticle system by controlling the chemical solution environments through ionic strength of the solution, which can be further controlled by reaction temperature, pressure, initial precursor concentration, initial pH and ionic strength of the solution etc.

Uncoated nanoparticles typically interact with the surrounding chemical environment, which results in the transformation of nanoparticles to new structures either chemically or physically. Thus, the majority of synthesis methods, as reported in prior art, utilize stabilizers (surfactants, organic ligands, polymers and dendrimers, and so on) to arrest the chemical transformation of as produced nanoparticles and therefore enhancing the application performance of nanoparticles. However, it is difficult to stabilize the nanoparticles during synthesis without using any surfactants. Employing the large quantities of stabilizers is not only commercially expensive but also not favorable for the environment. In the present work, we attempted to produce the stable nanoparticles without using any stabilizers.

Various embodiments disclosed herein provides method for stable well dispersed nanoparticle production using solvothermal method. For example, in one embodiment, a solvothermal synthesis-based method for preparation of stable well dispersed nanoparticles without using any stabilizing agents by manipulating the interactions among the particles. In the present invention, the stability refers to dispersion stability of nanoparticles, which depends on the particle characteristics (size, shape, and crystallinity), stabilizing agents (surfactants, ligands or polymers), polarity of reagents and solvent, number of reagent molecules coated on nanoparticle surface, pH, ionic strength, and temperature etc. In the disclosed embodiments, the interactions among the particles is manipulated by controlling process conditions, such as, temperature, pressure, pH, precursor concentration, and ionic strength of a solution containing a precursor and a base. By manipulating temperature, pressure and initial concentration, ionic strength and pH of the solution, solvothermal reaction rates and therefore the speciation of metal ions (the distribution of intermediate metal ions and product molecules) can be controlled. The speciation of metal ions determine the net surface charge of the particles in the solution. The inter-particle forces acting on the as synthesized nanoparticle in the presence of dissolved ions are van der Walls attractions and electrostatic double layer repulsive forces. The former is always present, independent of the solution composition, whereas the latter is strongly dependent on the ionic strength of the solution. The interplay between these interactions determine the final stability of nanoparticles in the solution. The electrostatic double layer repulsive forces can be manipulated by changing the ionic strength of the solution (depends on the speciation of metal salt). For example, the repulsive forces are screened as ionic strength increases whereas those are more prominent as ionic strength decreases. At an isoelectric point (ISP), the electrostatic interactions are completely screened resulting in a destabilization of the nanoparticle suspension, by forming aggregates. The critical coagulation concentration determines the transition of the stable and unstable system of nanoparticle slurry. Based on Schulze-Hardy (S-H) rule, the critical coagulation concentration can be defined as: $c \propto z^{-6}$, where, z is the valence of counterions. In an example embodiment, Ceria is used as a model system for the production of stable metal oxide nanoparticles, however, it should be understood that the aforementioned embodiments are equally applied to process conditions of any of the solutions wherein the process conditions are capable of modifying/screening the surface charges during the reaction.

In an example scenario, the disclosed embodiments were utilized to prepare stable nanoparticles in a single step method without using any surface modifiers. Highly crystalline phase with cubic crystal structure and larger quantities of ceria mono-dispersed particles are produced with a particle size range in 20-30 nm. The disclosed example scenario will be explained in detail in the description below. An important contribution of the disclosed embodiments is that, unlike conventional methods, the embodiments facilitate nanoparticles production without using stabilizing agents.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 8E, where similar reference characters denote corresponding features consistently throughout the figures, there are shown preferred embodiments and these embodiments are described in the context of the following exemplary system and/or method.

FIG. 1 illustrates a flow-diagram of a method 100 for production of stable and uniformly distributed nanoparticles, in accordance with an example embodiment. At 102, the method includes employing a solvothermal reactor for enabling process conditions during a reaction resulting in production of nanoparticles. An example of the solvothermal reactor is described further with reference to FIG. 2. The process conditions enabled by the solvothermal reactor are characterized in manipulating the electrostatic double layer repulsive forces among nanoparticles produced to impart the dispersion stability of nanoparticles produced during the reaction. In various embodiments, examples of the metal precursor solution may include but are not limited to, titanium tetrachloride, silicon tetrachloride, aluminium nitrate, cerium nitrate, and zirconium nitrate. The solvents may include water, carbon dioxide, ethanol, and methanol. The method of enabling the process conditions by the solvothermal reactor is described further with reference to steps 104-106.

At 104, the reaction is enabled by pouring a pH modifier dropwise into a metal precursor solution with vigorous stirring, resulting in formation of a metal hydroxide solution. For the purpose of production of stable and uniformly dispersed nanoparticles, the process conditions may include the concentration of metal precursor solution, pH of the metal precursor solution, and ionic strength of the metal precursor solution. The ionic strength can be estimated by measuring the ionic conductivity. The process conditions further includes speed of stirring and the aging time. Herein, the concentration of metal precursor solution is maintained in a range of around 0.15M to 0.75 M, pH in the range of 9 to 12, and the ionic conductivity is in the range of 50 to 200 mS/cm. Here, ionic conductivity indicates the ionic strength. In an embodiment, the speed of stirring is about 800 to 1200 rpm and the aging time in the range of 6 to 24 hours.

At 106, the method 100 includes heating the metal hydroxide solution and maintaining a temperature of the solvothermal reactor in the range of 100 to 400° C. obtain nanoparticle slurry consisting of a stable suspension of the nanoparticles. As a result of the reaction, the nanoparticles produced are 2 to 5 percentage by weight.

The solvothermal reactor is quickly quenched to room temperature after completion of the reaction.

The nanoparticle slurry is cleaned with double distilled water and ethanol simultaneously for a plurality of times to remove impurities, unreacted ions and precursor and obtain cleaned samples. The cleaned samples may be centrifuged to separate the nanoparticles from the nanoparticle slurry. Further, the cleaned samples are oven dried to obtain a dry ceria powder.

An example of the solvothermal reactor is described further with reference to FIG. 2.

FIG. 2 illustrates a solvothermal reactor 200 for production of stable and uniformly distributed nanoparticles, in accordance with an example embodiment. The solvothermal reactor 200 (hereinafter referred to as a 'reactor') is configured to facilitate the production of the stable and uniformly distributed nanoparticles from a precursor solution by enabling process conditions manipulating the electrostatic double layer repulsive forces among nanoparticles produced to impart the dispersion stability of nanoparticles produced during the reaction. The reactor 200 includes an autoclave hydrothermal reactor 202, an electric heater 204, a hydrothermal rotor attached with a motor 206 through a magnetic drive 208, and a control panel 210. The reactor 200 consists of various internal components such as a thermal well for thermocouple, a sample tube to collect the sample, and cooling tubes such as tubes 212, and an impeller 214. The cooling tubes serve to not only control the reactor set temperature but also quench the reactor instantaneously after the reaction is complete. The thermocouple is sealed in the thermal well. In an example scenario, the reactor, internals, and all wetted parts may be made of Hastelloy-C, whereas all the external components, tubing and fittings may be made of stainless steel (SS316). Hastelloy-C is more corrosive resistant as compared to SS316. In an example scenario, the reactor may have following specification: an inner diameter of around 65 mm and length of around 76.8 mm with the net volume of 250 ml; the inner diameters of the reactor cooling tubes, thermal well, and sample tube are 5, 7, and 6 mm, respectively; the agitator consists of a four bladed 45° pitched turbine impeller (PTB), which is made of Hastelloy-C; and the diameters of impeller and impeller tubes are 30 and 6 mm, respectively.

An example of producing stable and homogeneously dispersed nanoparticles is described further with reference to FIGS. 3-8E below.

EXAMPLE SCENARIO

In an example scenario, Cerium (III) nitrate hexahydrate (Ce(NO3)3·6H2O, REacton®) with 99.5% purity and sodium hydroxide (NaOH) pellets were used without any further purification. Double distilled (DD) water has been used as a solvent.

Initially, cerium (III) nitrate solution and sodium hydroxide solutions were prepared separately by adding the known quantities of respective salts in a solvent such as DD water. Then the sodium hydroxide solution was poured into cerium nitrate solution in a drop-wise manner with vigorous stirring, resulting in the light brown colour precipitate (Ce(OH) 3), which subsequently turns out into purple colour, representing the formation of Ce(OH)4. The solution was then placed in an autoclave reactor of the reactor 200, which was subjected to heating to maintain the reactor set temperature. Here, the pressure is indigenously generated inside the reactor, depending on the reactor temperature—pressure is not controlled independently. The reactor was quickly quenched to room temperature after completion of the experiment. The reaction was carried out for 24 hours and the samples were collected in the form of nanoparticle slurry (light yellow in color) at definite time intervals for the characterization. The formation of ceria from cerium nitrate can be represented using the below chemical reaction.

$$2Ce(NO_3)_3 + 1/2\,O_2 + 6OH^- \rightarrow 2CeO_2 + 6NO_3^- + 3H_2O \quad (2.1)$$

The samples collected from the reactor were cleaned with DD water and ethanol simultaneously for several times to remove the impurities, unreacted ions and precursor and then centrifuged to separate the particles. They were then oven dried to obtain the dry ceria powder. The ionic conductivity and pH of the initial solution, nanoparticle slurry collected at different time intervals, and residual solution after separating the particles were measured using conductivity meter (TCM15+) and pH meter. The residue solution after separating the particles was analyzed using Ultraviolet-Visible Spectroscopy (UV-Vis spectroscopy) for detecting the unreacted $Ce(NO_3)_3$ precursor concentration, then determining the reaction kinetics. The dry product particles were analyzed using the X-ray Diffraction (XRD) for identifying the phase and crystallinity of the product particles. The dry particles were dispersed in ethanol using ultrasonic bath and drop-casted on a silicon wafer and carbon-coated copper grids, which were oven dried for 24 hours. They were then analysed using scanning electron microscopy (SEM) and transmission electron microscopy (TEM) to determine the particle size and morphology.

In an example scenario, to determine the process regime for the production of stable nanoparticles, there were three different set of experiments performed at different process conditions, namely, reactor temperature, stirring speed, precursor concentration, and aging times. The temperature of the reactor was varied from 25 to 400° C., accounting for the subcritical and near critical conditions. The stirring speeds were varied from 50 rpm to 1200 rpm, covering the laminar-turbulent transition regime to fully developed turbulent regime. A wide range of precursor ($Ce(NO_3)_3 \cdot 6H_2O$) concentrations was employed ranging from 0.025 to 0.5 M, ranging from dilute to concentrated systems. The aging time varied from 6 hours to 24 hours for all the experiments.

Figure 3:
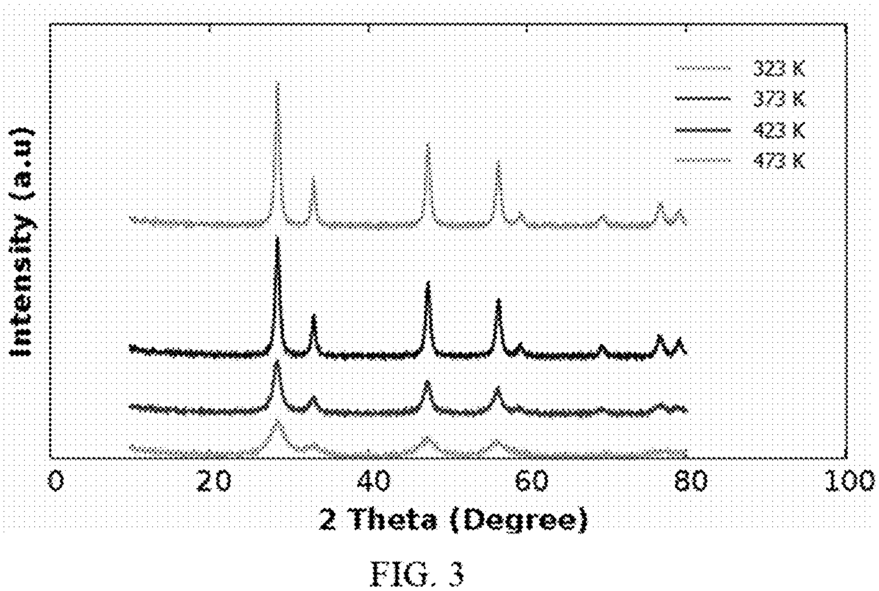
FIG. 3 illustrates X-ray diffraction patterns of synthesized ceria nanoparticles at different temperatures in accordance with various embodiments of the present disclosure.
Figure 4A:
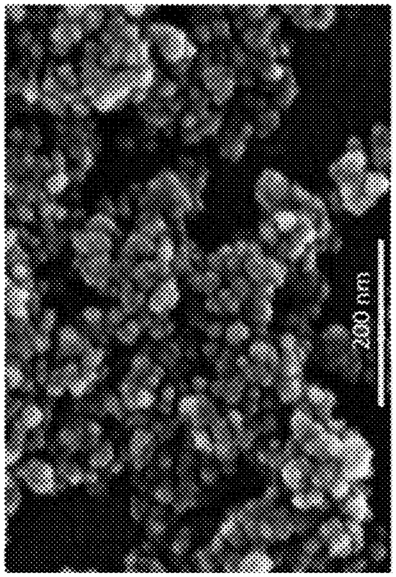
FIGS. 4A-4D illustrates SEM images of ceria nanoparticles produced at T=150° C., stirring speed of 1200 rpm, and precursor concentration, $C_{Ce(NO3)3}$=0.05 M for different aging times, namely at 6 hours (FIG. 4A), 12 hours (FIG. 4B), 18 hours (FIG. 4C), 24 hours (FIG. 4D), respectively.
Figure 4B:
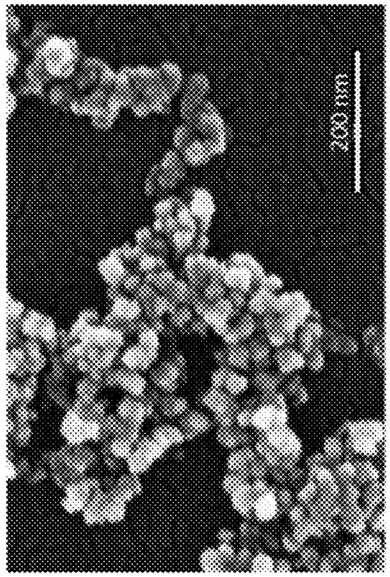
Figure 4C:
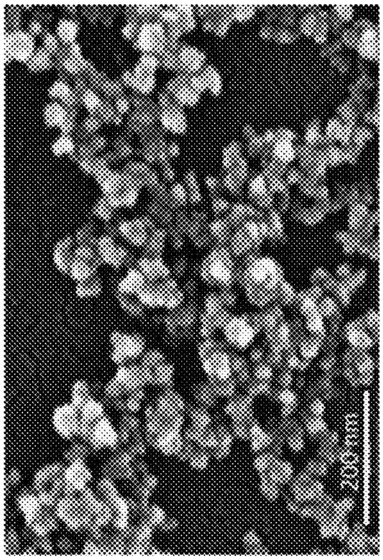
Figure 4D:
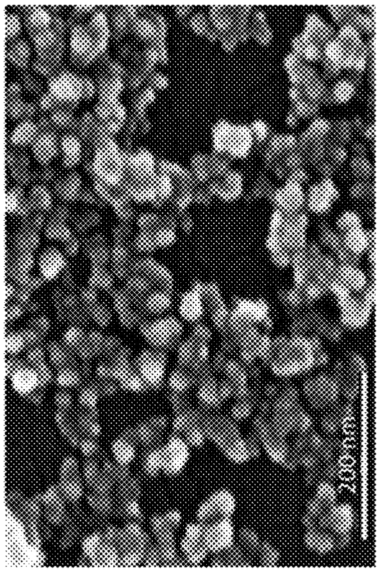
Figure 5A:
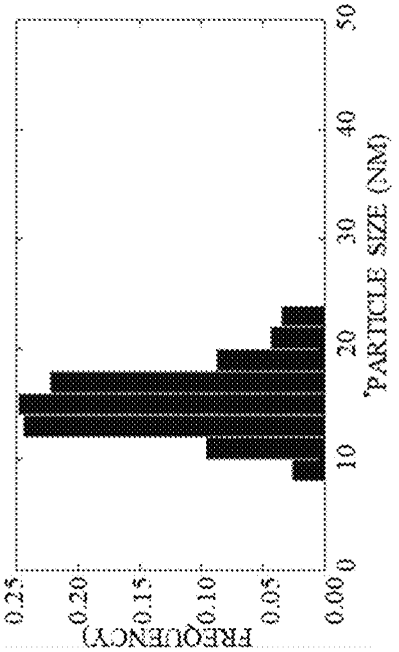
FIGS. 5A-5D illustrates evolution of PSD of ceria nanoparticles produced using batch solvothermal reactor at T=150° C., precursor concentration, $C_{Ce(NO3)3}$=0.05 M, and stirring speed, N=1200 rpm for different aging times: (a) 6 h (b) 12 h (c) 18 h (d) 24 h, respectively.
Figure 5B:
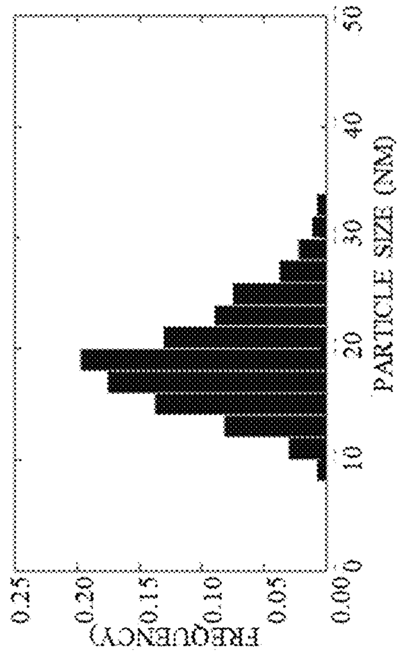
Figure 5C:
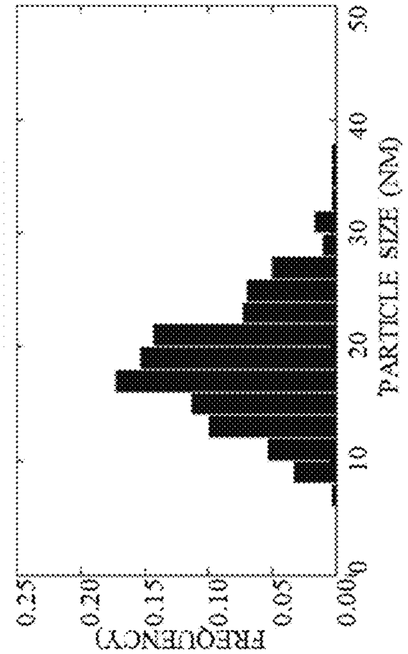
Figure 5D:
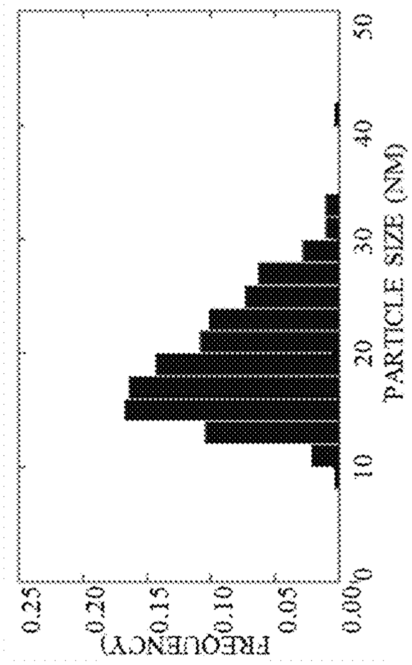
Figure 6A:
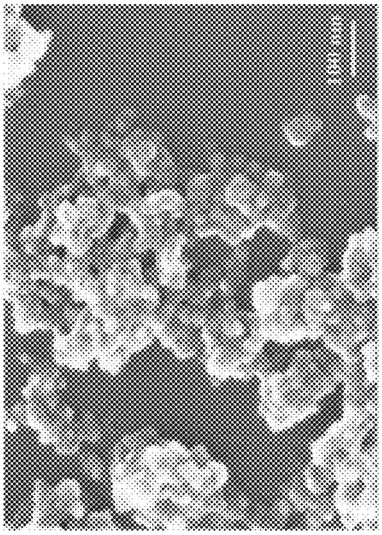
FIGS. 6A-6D illustrates effect of the reactor temperature on ceria nanoparticles produced (SEM images) using batch solvothermal reactor at precursor concentration, CCe(NO3)3=0.05 M, and stirring speed, N=1200 rpm after 24 hours of solvothermal treatment: (a) 50° C. (b) 200° C. (c) 300° C. (d) 350° C., respectively.
Figure 6B:
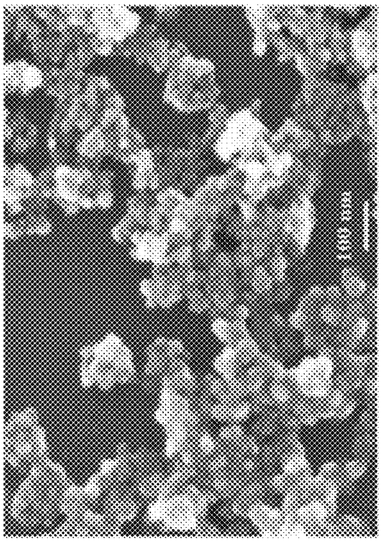
Figure 6C:
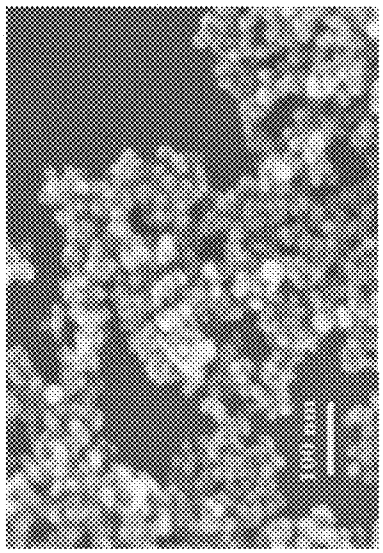
Figure 6D:
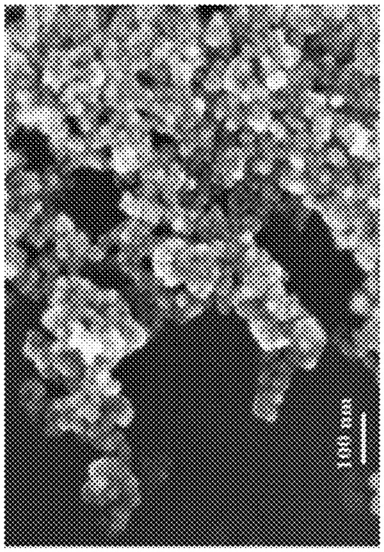
Figure 7A:
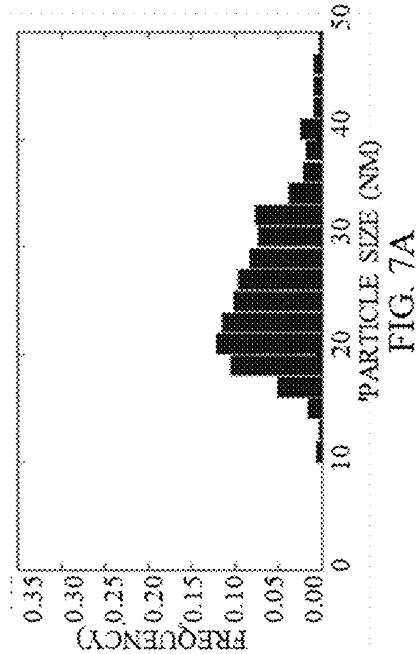
FIGS. 7A-7D illustrates the effect of reactor temperature on particle size distribution (PSD) of ceria nanoparticles produced using batch solvothermal reactor at precursor concentration, CCe(NO3)3=0.05 M, stirring speed, N=1200 rpm, after 24 hours of solvothermal treatment: (a) 50° C. (b) 200° C. (c) 300° C. (d) 350° C., respectively.
Figure 7B:
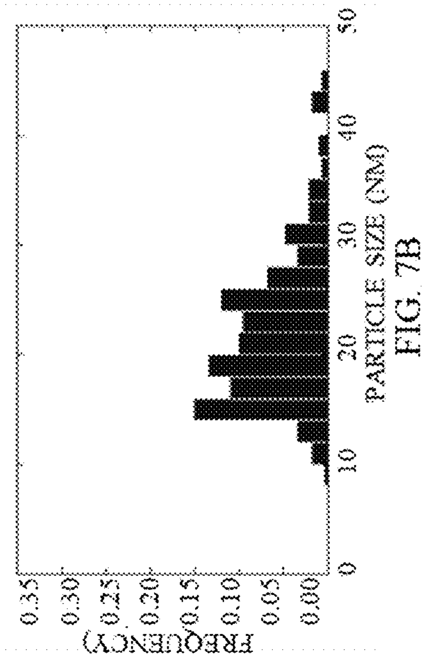
Figure 7C:
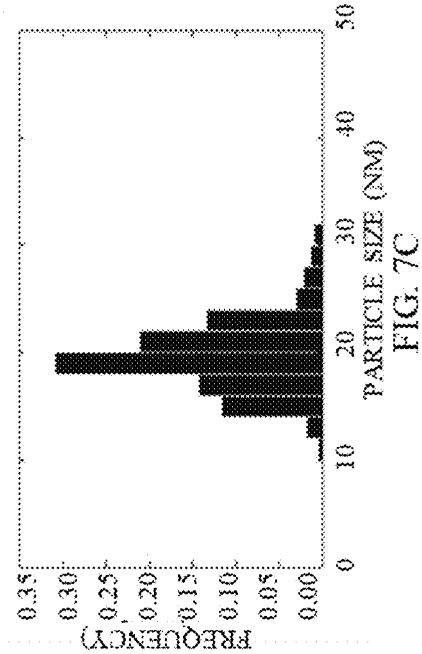
Figure 7D:
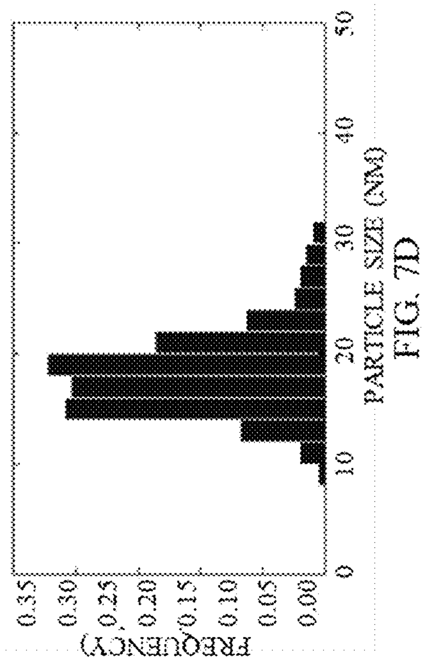
Figure 8A:
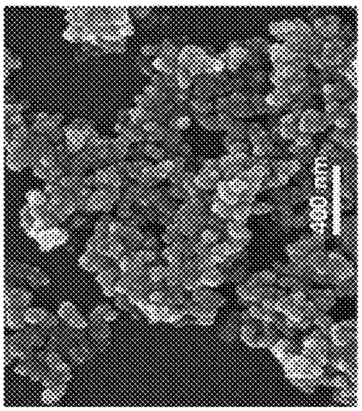
FIGS. 8A-8F illustrates the effect of precursor concentration (CCe(NO3)3) on ceria nanoparticles produced (SEM images) using batch solvothermal reactor at reactor temperature, T=200° C. and stirring speed, N=1200 rpm after 24 hours of solvothermal treatment: (a) 0.025 M, (b) 0.05 M, (c) 0.075 M, (d) 0.15 M, (e) 0.3 M, (f) 0.5 M, respectively.
Figure 8B:
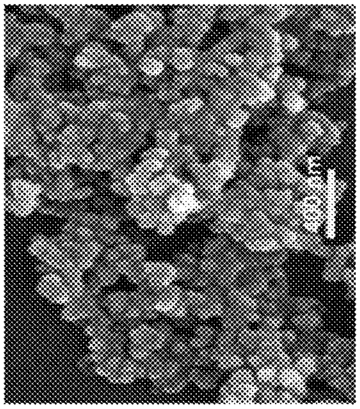
Figure 8C:
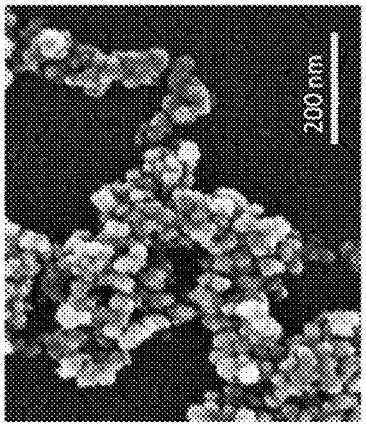
Figure 8D:
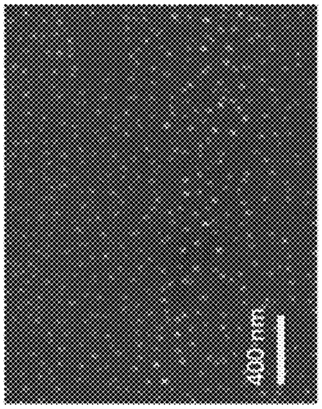
Figure 8E:
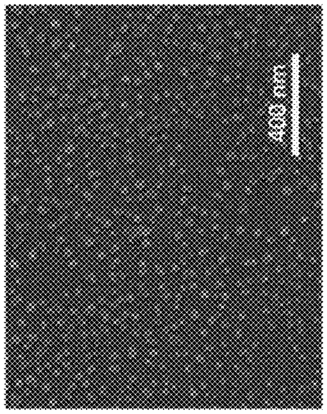
Figure 8F:
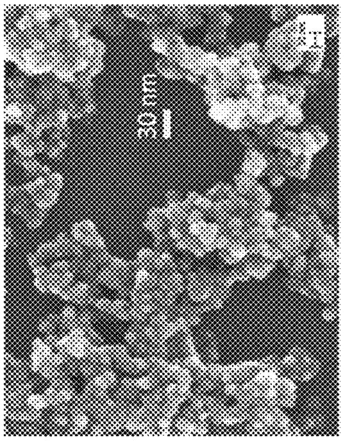

The X-ray diffraction patterns of synthesized ceria nanoparticles at different temperatures are shown in FIG. 3. The diffraction patterns for all the samples are identical to that of a standard ceria pattern, having a fluorite structure, without any traces of impurities or additional phases. The XRD patterns become sharper as temperature increases indicating that improved crystallinity with increase in temperature.

The SEM images of ceria nanoparticles produced at T=150° C., stirring speed of 1200 rpm, and precursor concentration, CCe(NO3)3=0.05 M for different aging times, namely at 6 hours (FIG. 4A), 12 hours (FIG. 4B), 18 hours (FIG. 4C), 24 hours (FIG. 4D), are shown in FIGS. 4A-4D respectively. The formation of aggregates are evident. This can be due to incomplete/insufficient screening of the electrostatic forces among the particles, which cannot avoid the particle aggregation. However, electrostatic screening of the particles can be improved under highly acidic or basic conditions. Hence, highly alkaline (pH=13)

conditions have been employed in the present example scenario but still it results in aggregation. It can also be observed that the morphology of the primary particles in the aggregates are relatively spherical and uniform in shape. Here, the primary particle is an individual entity of the aggregates. The evolution of the particle size distribution (PSD) of the produced ceria particles over aging time can be seen in FIGS. 5A-5D.

Particularly, FIGS. 5A-5D illustrates evolution of PSD of ceria nanoparticles produced using batch solvothermal reactor at T=150° C., precursor concentration, CCe(NO3)3=0.05 M, and stirring speed, N=1200 rpm for different aging times: (a) 6 h (b) 12 h (c) 18 h (d) 24 h, respectively. Each PSD plot was generated by analysing 300 particles using at least six different SEM images obtained from three independent experiments. The PSD becomes broader and mean particle size steeply increases due to coarsening of the particles with time.

Further, the effect of reaction temperature on ceria nanoparticles are shown in FIGS. 6A-6D and 7A-7D. As illustrated, FIGS. 6A-6D illustrates effect of the reactor temperature on ceria nanoparticles produced (SEM images) using batch solvothermal reactor at precursor concentration, CCe(NO3)3=0.05 M, and stirring speed, N=1200 rpm after 24 hours of solvothermal treatment: (a) 50° C. (b) 200° C. (c) 300° C. (d) 350° C., respectively.

FIGS. 7A-7D illustrates the effect of reactor temperature on particle size distribution (PSD) of ceria nanoparticles produced using batch solvothermal reactor at precursor concentration, CCe(NO3)3=0.05 M, stirring speed, N=1200 rpm, after 24 hours of solvothermal treatment: (a) 50° C. (b) 200° C. (c) 300° C. (d) 350° C., respectively. Each PSD plot was generated by analysing 300 particles using at least six different SEM images obtained from three independent experiments.

FIGS. 8A-8F illustrates the effect of precursor concentration (CCe(NO3)3) on ceria nanoparticles produced (SEM images) using batch solvothermal reactor at reactor temperature, T=200° C. and stirring speed, N=1200 rpm after 24 hours of solvothermal treatment: (a) 0.025 M, (b) 0.05 M, (c) 0.075 M, (d) 0.15 M, (e) 0.3 M, (f) 0.5 M, respectively.

The effect precursor concentration on ceria nanoparticles produced at T=200° C. and stirring speed, N=1200 rpm after 24 hours of solvothermal treatment can be seen in FIG. 7. The aggregates of ceria nanoparticles are formed for CCe (NO3)3≤0.075 M and ≥0.5 M, whereas stable well dispersed nanoparticles are obtained in the concentration range of 0.15 to 0.3 M. This can be attributed to the screening of van der Waals interactions through electrostatic repulsion of ceria nanoparticles in the concentration range: 0.15 to 0.3 M. The dispersion stability of ceria nanoparticles typically depends on the polarity and number of molecules coated on ceria surface, pH, ionic concentration, and temperature etc. Since surface energy of ceria nanoparticles is high, the counter ions formed through reaction are attached on the surface of ceria nanoparticles, imparting negative charge on ceria nanoparticles suspended in the reaction mixture. As concentration of Ce(NO3)3 increases, the resulting concentration of counter ions (anions: NO3−) also increases. This results in increase in the surface ions and therefore negative charge on the ceria nanoparticle surface. The negative charge completely screens the van der Waals attraction among the particles in the concentration range: 0.15 to 0.3 M, whereas further increase in Ce(NO3)3 leads to electrostatic attraction between the particles. Thus, monodisperse nanoparticles are formed in the concentration range: 0.15 to 0.3 M at T=200° C. and stirring speed, N=1200 rpm after 24 hours of aging time. Similarly, the process regimes can be identified for different process temperatures and aging times by obtaining the isoelectric points of the ceria nanoparticles at the given reaction environment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides a method for production of homogeneously dispersed and stable nanoparticles using solvothermal method. In various embodiments, a solvothermal reactor is provided for enabling process conditions of a reactor in a manner so as to manipulate the electrostatic double layer repulsive forces among nanoparticles produced to impart the dispersion stability of nanoparticles produced as a result of the reaction. The nanoparticles so produced are determined to be stable and homogeneously dispersed.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A solvothermal synthesis method for production of stable and uniformly dispersed nanoparticles, the solvothermal synthesis method comprises:

employing a solvothermal reactor for enabling process conditions during a reaction resulting in production of the nanoparticles, the process conditions characterized by manipulating electrostatic double layer repulsive forces among the nanoparticles to impart dispersion stability of the nanoparticles produced as a result of the reaction, wherein the nanoparticles are produced without using one or more surface modifiers or one or more stabilizing agents in the reaction, wherein the reaction is a single step reaction process resulting in production of stable and uniformly dispersed nanoparticles, wherein the one or more surface modifiers or the one or more stabilizing agents includes one or more of surfactants, additives, polymers, organic ligands and dendrimers, wherein enabling the process conditions comprises:

enabling the reaction by pouring a pH modifier drop wise into a metal precursor solution with vigorous stirring resulting in formation of a metal hydroxide solution, concentration of the metal precursor solution maintained in a range of 0.15M to 0.75 M, pH in a range of 9 to 12, ionic conductivity of the metal precursor solution maintained in a range of about 50 to 200 mS/cm, and wherein a speed of stirring is about 800 to 1200 rpm, wherein aging time is in a range of 6 to 24 hours and the electrostatic double layer repulsive forces are manipulated by changing the ionic conductivity of the metal precursor solution, thereby interaction potential among nanoparticles' surface is manipulated by changing the ionic conductivity of the metal precursor solution to control dispersion stability of the nanoparticle solution; and heating the metal hydroxide solution and maintaining a temperature of the solvothermal reactor at 200° C. for 24 hours to obtain a nanoparticle slurry comprising a stable suspension of the uniformly dispersed nanoparticles, wherein as the result of the reaction the nanoparticles produced are 2 to 5 percentage by weight of the nanoparticle slurry, wherein the metal precursor solution comprises a cerium nitrate solution and the pH modifier comprises a sodium hydroxide solution, and the metal hydroxide solution is a cerium hydroxide solution, and concentration of the cerium nitrate solution maintained in a range of 0.15 M to 0.3 M, wherein ceria mono-dispersed nanoparticles are produced in a particle size range in 20-30 nm;

wherein further interactions among the nanoparticles are manipulated by controlling temperature of the reaction, pressure of the reaction, initial concentration of the metal precursor solution, and rate of the reaction to obtain the nanoparticle slurry.

2. The method of claim 1, wherein the solvothermal reactor comprises an autoclave reactor, an electrical heater, a rotor attached with a motor through a magnetic drive, and a control panel.

3. The method of claim 1, further comprises preparing the cerium nitrate solution by adding cerium nitrate salt in double distilled (DD) water.

4. The method of claim 1, further comprises preparing the sodium hydroxide solution by adding sodium hydroxide salt in double distilled (DD) water.

* * * * *